(12) United States Patent
Jones et al.

(10) Patent No.: US 9,732,857 B2
(45) Date of Patent: Aug. 15, 2017

(54) ONE-WAY PRESSURE ACTIVATED PISTON SEAL

(71) Applicant: BorgWarner Inc., Auburn Hills, MI (US)

(72) Inventors: Michael E. Jones, Lake Orion, MI (US); Jeffrey J. Waterstredt, Royal Oak, MI (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 14/383,172

(22) PCT Filed: Mar. 7, 2013

(86) PCT No.: PCT/US2013/029492
§ 371 (c)(1),
(2) Date: Sep. 5, 2014

(87) PCT Pub. No.: WO2013/138144
PCT Pub. Date: Sep. 19, 2013

(65) Prior Publication Data
US 2015/0041693 A1 Feb. 12, 2015

Related U.S. Application Data

(60) Provisional application No. 61/611,506, filed on Mar. 15, 2012.

(51) Int. Cl.
*F16K 1/46* (2006.01)
*F16J 9/08* (2006.01)
(Continued)

(52) U.S. Cl.
CPC ...... *F16K 1/46* (2013.01); *F16J 9/08* (2013.01); *F16J 9/14* (2013.01); *F16J 15/164* (2013.01);
(Continued)

(58) Field of Classification Search
CPC ...... F16K 1/46; F16K 31/0655; F16K 31/0693; F16K 31/0658; F16J 15/46; F16J 15/56; F16J 9/14; F16J 15/164; F16J 9/08
(Continued)

(56) References Cited

U.S. PATENT DOCUMENTS 1,751,445 A   3/1930   Davis
2,456,356 A * 12/1948  Aber ................. F16J 15/32
                                                277/584

(Continued)

FOREIGN PATENT DOCUMENTS

CN       101166924 A    4/2008
DE   10 2010 033 647 A1  2/2012
(Continued)

OTHER PUBLICATIONS

English language abstract not found for CN 101166924; however, see English language equivalent U.S. Pat. No. 7,988,125. Original document extracted from espacenet.com on Nov. 14, 2016, 18 pages.

(Continued)

*Primary Examiner* — John Bastianelli
(74) *Attorney, Agent, or Firm* — Howard & Howard Attorneys PLLC

(57) ABSTRACT

A solenoid actuated valve (10) holds pressure and volume of an accumulator with low leakage and provides low actuation drag during a release stroke for dumping fluid contents of the accumulator at very low current draw. Two elongate valve members (10a, 10b) are assembled to be movable axially relative to one another with a gland or groove (10c) formed in one of the two valve members (10a). An o-ring (12) located within the groove (10c) is in a non-contacting relationship to the other valve member (10b) when in a non-energized state. An energizer ring (14) located within (Continued)

the groove (10*c*) can reciprocate axially with respect to the o-ring (12). The energizer ring (14) moves axially toward the o-ring (12) in response to fluid pressure against a surface (14*a*) of the energizer ring (14) opposite from the o-ring (12) to axially compresses the o-ring (12), causing the o-ring (12) to expand radially outwardly into sealing contact with the other valve member (10*b*).

13 Claims, 3 Drawing Sheets

(51) Int. Cl.
| | |
|---|---|
| *F16K 31/06* | (2006.01) |
| *F16J 15/16* | (2006.01) |
| *F16J 9/14* | (2006.01) |
| *F16J 15/46* | (2006.01) |
| *F16J 15/56* | (2006.01) |

(52) U.S. Cl.
CPC ............ *F16J 15/46* (2013.01); *F16J 15/56* (2013.01); *F16K 31/0655* (2013.01); *F16K 31/0658* (2013.01); *F16K 31/0693* (2013.01)

(58) Field of Classification Search
USPC .................. 251/172, 175, 190, 191, 129.15; 277/589, 910
See application file for complete search history.

(56) References Cited

U.S. PATENT DOCUMENTS

| | | | | |
|---|---|---|---|---|
| 2,809,080 | A * | 10/1957 | Mittell | F16J 15/166 |
| | | | | 277/458 |
| 3,525,530 | A * | 8/1970 | Bauer | F16J 15/32 |
| | | | | 277/451 |
| 3,556,474 | A * | 1/1971 | Scaramucci | F16K 5/0673 |
| | | | | 251/172 |
| 3,592,164 | A | 7/1971 | Schultze | |
| 3,749,357 | A * | 7/1973 | Fowler | F16K 3/207 |
| | | | | 251/172 |
| 3,930,657 | A * | 1/1976 | Svensson | F16J 15/32 |
| | | | | 277/451 |
| 4,024,743 | A | 5/1977 | Decours et al. | |
| 4,027,816 | A * | 6/1977 | Slator | F16J 15/166 |
| | | | | 277/437 |
| 4,053,166 | A * | 10/1977 | Domkowski | F16J 15/3208 |
| | | | | 277/558 |
| 4,074,700 | A * | 2/1978 | Engle | B60T 8/3615 |
| | | | | 137/625.27 |
| 4,109,921 | A | 8/1978 | Urbaschek | |
| 4,178,000 | A | 12/1979 | Kuttner | |
| 4,291,890 | A | 9/1981 | Walker | |
| 4,469,017 | A | 9/1984 | Hanlon | |
| 4,749,201 | A * | 6/1988 | Hunger | F16J 15/166 |
| | | | | 277/311 |
| 4,991,495 | A | 2/1991 | Loegel, Sr. et al. | |
| 5,082,295 | A | 1/1992 | Wetzel | |
| 5,140,904 | A | 8/1992 | Schonlau | |
| 5,143,382 | A | 9/1992 | Maringer | |
| 5,437,436 | A * | 8/1995 | Holson | F16F 9/36 |
| | | | | 188/322.17 |
| 5,451,065 | A * | 9/1995 | Holder | F16J 15/3468 |
| | | | | 277/390 |
| 6,129,358 | A | 10/2000 | Kiesel et al. | |
| 6,158,744 | A * | 12/2000 | Jones | F16J 15/164 |
| | | | | 277/448 |
| 6,502,826 | B1 | 1/2003 | Schroeder et al. | |
| 6,648,337 | B1 | 11/2003 | Baehl et al. | |
| 7,341,258 | B2 * | 3/2008 | Holt | F16J 15/166 |
| | | | | 277/584 |
| 7,793,944 | B2 * | 9/2010 | Otuka | F16J 15/062 |
| | | | | 277/584 |
| 7,815,195 | B2 | 10/2010 | Meller et al. | |
| 7,988,125 | B2 | 8/2011 | Cho et al. | |
| 2003/0057658 | A1 | 3/2003 | Hope et al. | |
| 2009/0120521 | A1 | 5/2009 | Clark et al. | |

FOREIGN PATENT DOCUMENTS

| | | |
|---|---|---|
| EP | 1794482 B1 | 9/2009 |
| JP | 2676259 B2 | 11/1991 |
| JP | 2002-156043 A | 5/2002 |

OTHER PUBLICATIONS

English language abstract and machine-assisted English translation for DE 10 2010 033 647 extracted from espacenet.com database on Nov. 14, 2016, 17 pages.

English language abstract for JP 2676259 extracted from espacenet.com database on Nov. 21, 2016, 2 pages.

English language abstract and machine-assisted English translation for JP 2002-156043 extracted from espacenet.com database on Nov. 14, 2016, 15 pages.

\* cited by examiner

ONE-WAY PRESSURE ACTIVATED PISTON SEAL

FIELD OF THE INVENTION

The invention relates to a one-way pressure activated piston seal and method that provides low drag when not activated by pressure and low leakage when activated by pressure.

BACKGROUND

The industry has many variations on piston seals using o-rings and polytetrafluoroethylene (PTFE) rings, sometimes referred to using the brand name TEFLON™. For example, various types and configurations of piston seals are disclosed in U.S. Pat. No. 7,815,195, U.S. Pat. No. 6,502,826, U.S. Pat. No. 6,129,358, U.S. Pat. No. 5,140,904, U.S. Pat. No. 5,082,295, U.S. Pat. No. 4,291,890, U.S. Pat. No. 4,109,921, and U.S. Pat. No. 3,592,164. While these piston seals appear to be appropriate for their intended purposes, none of these configurations provide a pressure activated low-leak seal with low actuation drag.

As best seen in FIG. 6, a prior known solenoid actuated hydraulic fluid valve 30 includes first and second valve members 30a, 30b, which are movable with respect to one another. One of the valve members 30a includes a groove 30c formed therein. A standard o-ring 32 is located within the groove 30c and biases a PTFE ring 34 into sealing engagement with the other valve member 30b. This sealing system uses the o-ring 32 to load a PTFE-based seal ring 34 against the inside diameter (ID) of the piston bore 36 defined by the second valve member 30b.

SUMMARY

While the prior known system created a good seal, it also produced higher drag than is desired. A solution was required that only needed to seal in one direction and that would release the seal during actuation to minimize or eliminate the amount of actuation drag. It would be desirable to provide a solenoid actuated hydraulic fluid valve with low leakage when sealed in one direction. It would be desirable to provide a solenoid actuated hydraulic fluid valve with low actuation drag in an opposite direction. It would be desirable to provide a solenoid actuated hydraulic fluid valve with a low leakage seal in response to fluid pressure, and a low actuation drag in the absence of fluid pressure.

In order to hold the pressure and volume of an accumulator, a hydraulic solenoid valve has very demanding leakage requirements. Additionally, the hydraulic solenoid valve needs to be able to stroke and dump the accumulator at very low current draw requiring low actuation drag. A one-way pressure activated piston seal can achieve the dual goals of low-leakage and low actuation drag for the hydraulic solenoid valve by sealing the valve in response to fluid pressure and by releasing the seal in response to initial solenoid actuator movement providing low actuation drag. It would be desirable to provide a high-flow, two-way, on/off hydraulic solenoid valve to close and hold a pressurized hydraulic accumulator with low leakage and then release and dump the accumulator with low actuation drag when requested.

A one-way pressure activated piston seal can include two members movable axially relative to one another with a gland or groove formed in one of two members. An o-ring can be located within the groove in a non-contacting relationship to the other of the two members when in a non-energized state. An energizer ring can be located within the groove for reciprocation axially with respect to the o-ring, where the energizer ring moves axially toward the o-ring in response to fluid pressure against a surface opposite from the o-ring and compresses the o-ring, causing the o-ring to expand radially outwardly into sealing contact with the other of the two members.

A method for sealing between two members movable axially with respect to one another in a one direction with low-leakage, while providing low drag in an opposite direction can include providing a gland or groove in one of the two members, positioning an o-ring in the groove in a non-contacting relationship with the other of the two members when in a non-energized state, and axially moving an energizer ring within the groove between first and second positions relative to the o-ring, where the energizer ring moves axially toward the o-ring in response to fluid pressure against a surface opposite from the o-ring and compresses the o-ring thereby causing axial compression of the o-ring and radial expansion of the o-ring into sealing contact with the other of the two members.

A solenoid actuated valve for holding pressure and volume of an accumulator with low leakage and for providing low actuation drag during release stroke of the solenoid actuated valve for dumping fluid contents of the accumulator at very low current draw can include two valve members movable axially relative to one another with a gland or groove formed in one of two valve members, an o-ring located within the groove in non-contacting relationship to the other of the two valve members when in a non-energized state, and an energizer ring located within the groove for reciprocation axially with respect to the o-ring, where the energizer ring moves axially toward the o-ring in response to fluid pressure against a surface opposite from the o-ring and compresses the o-ring causing the o-ring to expand radially outwardly into sealing contact with the other of the two valve members.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Referring now to FIGS. 1-4, a solenoid actuated, fluid valve 10 is depicted for holding pressure and volume of an accumulator with low leakage and for providing low actuation drag during a release stroke of the solenoid actuated valve for dumping fluid contents of the accumulator at very low current draw. The fluid valve 10 can include two elongate valve members 10a, 10b capable of reciprocal movement axially relative to one another with a gland or groove 10c formed in one of two valve members 10a.

Figure 1:
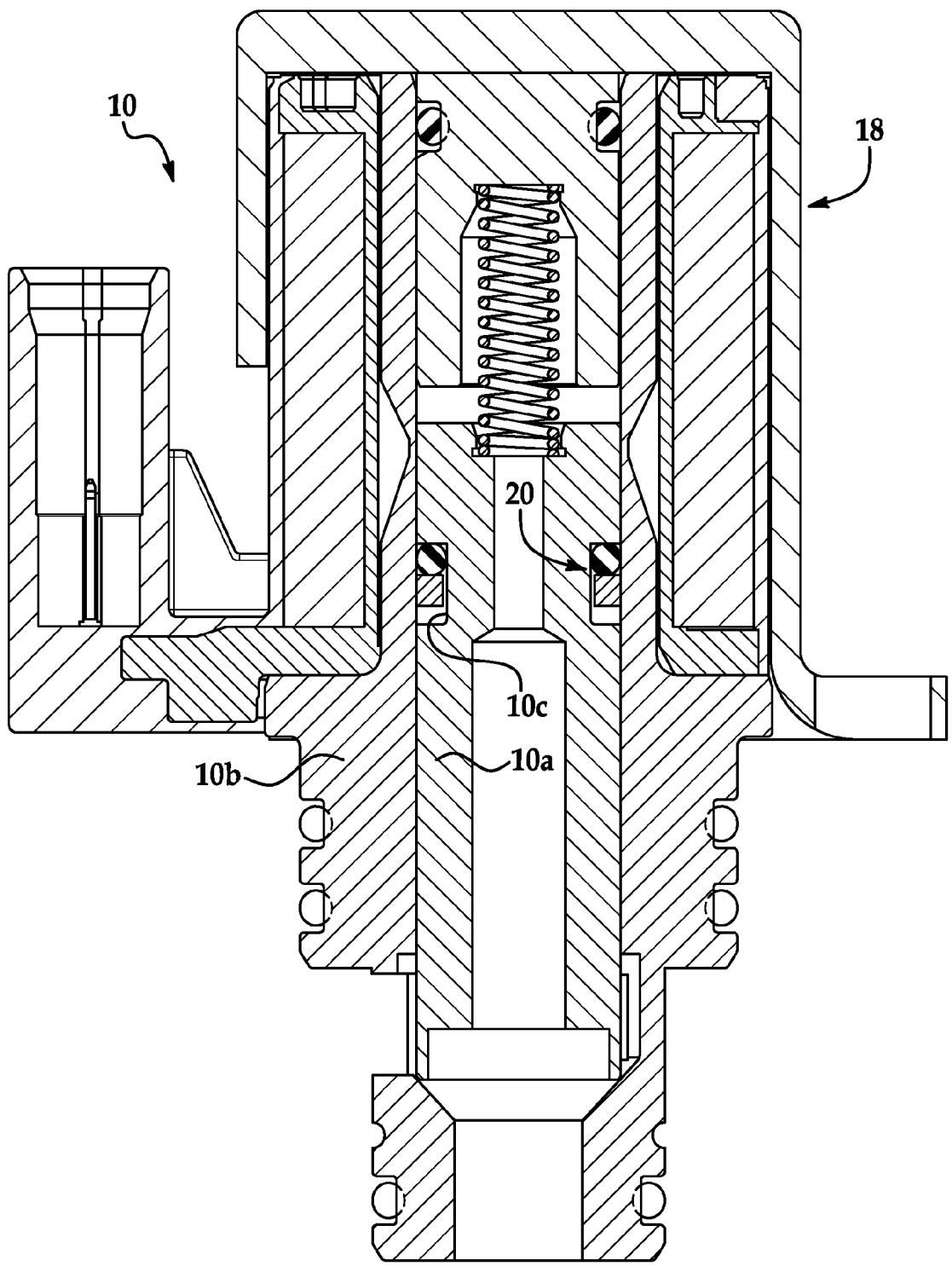
FIG. 1 illustrates a cross sectional view of a one-way pressure activated piston seal for a solenoid actuated valve having a solenoid armature (acting as a piston) with a gland on the outside diameter (OD) that accommodates an o-ring and an energizing ring, where without fluid pressure, the o-ring sits in the gland and is located clear of the piston bore.
Figure 2:
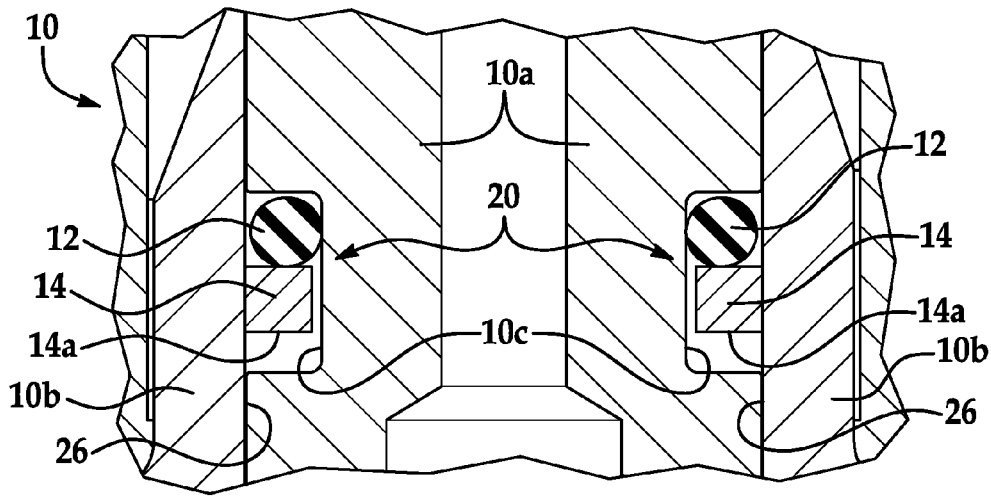
FIG. 2 illustrates a detailed cross sectional view of the o-ring and energizer ring of the one-way pressure activated piston seal for a solenoid actuated valve according to FIG. 1, where the o-ring and energizer ring are in a relaxed, non-energized state with the o-ring located clear of the piston bore.
Figure 5A:
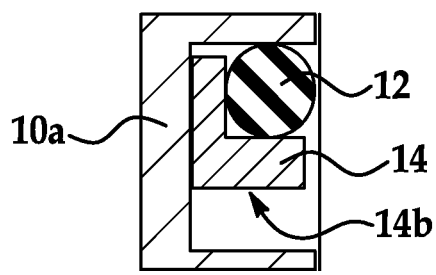
FIGS. 5A-5B illustrate alternative cross sections for the energizer ring.
Figure 5B:
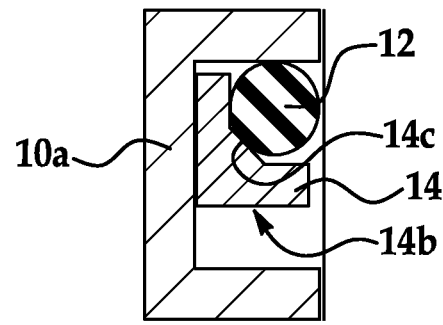
Figure 6:
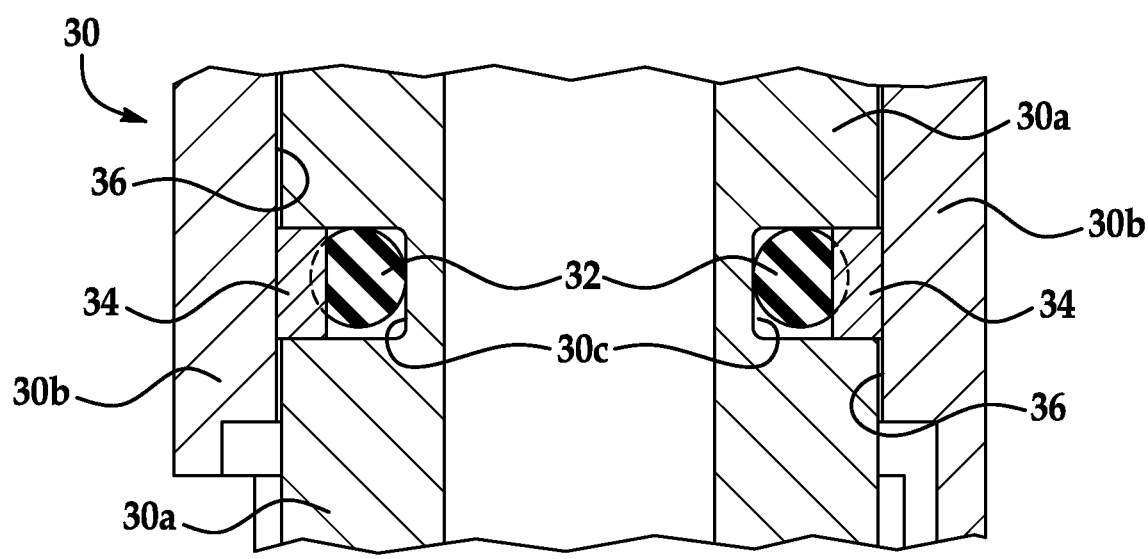
FIG. 6 illustrates a prior art solenoid valve having a standard o-ring energized PTFE piston seal ring, where the o-ring is used to load a PTFE-based seal ring against the inside diameter (ID) of a piston bore.

As best seen in FIG. 2, an o-ring 12 is located within the groove 10c in non-contacting relationship to the other of the two valve members 10b when in a non-energized state. An energizer ring 14 is located within the gland or groove 10c for reciprocation axially with respect to the o-ring 12. The energizer ring 14 is illustrated as having a rectangular cross section, or square cross section, with a surface 14a on a side opposite from the o-ring 12. However, it should be recognized that the energizer ring 14 can have any desired cross section. By way of example and not limitation, the energizer ring 14 can have an L-shaped cross section 14b as illustrated in FIG. 5A, or L-shaped cross section with an angled o-ring engaging surface 14c as illustrated in FIG. 5B, or L-shaped cross section with a curved o-ring engaging surface, or a triangular shaped cross section, or any combination thereof. In any case, the energized ring 14 includes a surface 14a on a side opposite from the o-ring 12 allowing fluid pressure to act on surface 14a of the energizer ring 14 to drive the energizer ring 14 axially into compressive engagement with the o-ring.

Figure 3:
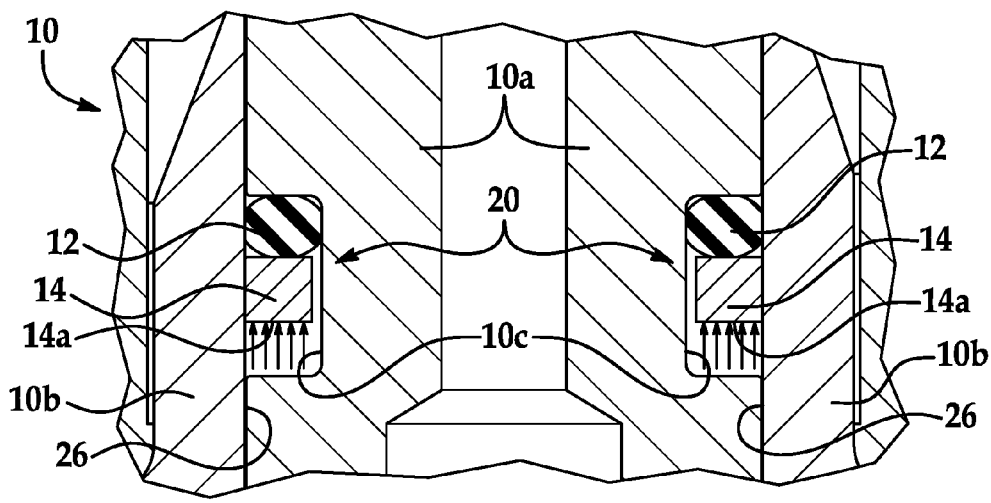
FIG. 3 illustrates a detailed cross sectional view of the o-ring and energizer ring of the one-way pressure activated piston seal for a solenoid actuated valve according to FIG. 1, where the o-ring and energizer ring are in an energized state with the o-ring compressed axially and expanded radially to seal the piston bore.

As best seen in FIG. 3, in response to fluid pressure, the energizer ring 14 moves axially toward the o-ring 12 against a surface 14a opposite from the o-ring 12. While in the fluid pressure energized state, the energizer ring 14 compresses the o-ring 12 causing the o-ring 12 to expand radially outwardly into sealing contact with the other of the two valve members 10b. The o-ring 12 is held in a radially outwardly expanded energized state by the energizer ring 14 in response to the fluid pressure acting on surface 14a.

Figure 4:
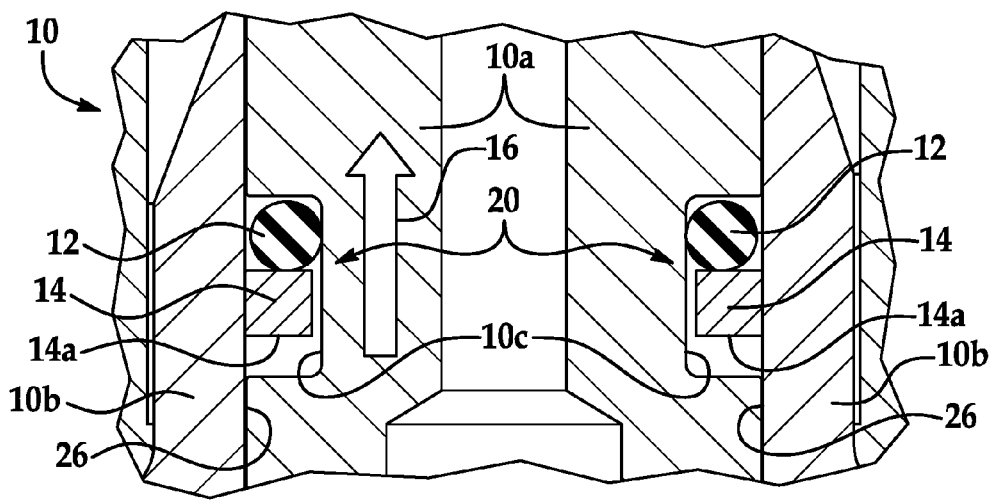
FIG. 4 illustrates a detailed cross sectional view of the o-ring and energizer ring of the one-way pressure activated piston seal for a solenoid actuated valve according to FIG. 1, where the solenoid actuated valve moves in the direction of the arrow relieving compression of the o-ring and returning the o-ring and energizer ring to the relaxed, non-energized state of FIG. 2.

As best seen in FIG. 4, when the solenoid 18 energizes to initiate movement of the valve member 10a in the direction of arrow 16, the movement of the valve member 10a releases or unloads compressive pressure on the o-ring 12 by the energizer ring 14 allowing the o-ring 12 to retract or transition from the radially expanded condition illustrated in FIG. 3 to return to the non-energized state illustrated in FIG. 2.

The one-way pressure activated piston seal assembly 20 was developed to resolve a sealing challenge related to a low-leak, high-flow, two-way, on/off, solenoid operated, hydraulic fluid valve. The solenoid operated fluid valve 10 is used to close and hold a pressurized hydraulic accumulator and then release and dump the accumulator when requested. In order hold the pressure and volume of the accumulator, the solenoid operated fluid valve 10 has very demanding leakage requirements. Additionally, the solenoid operated fluid valve 10 needs to be able to stroke and dump the accumulator at very low current draw and therefore needs to have low actuation drag.

Referring again to FIG. 1, the solenoid operated fluid valve 10 is illustrated with the solenoid armature 10a acting as a piston and with a gland 10c on the outside diameter (OD) that accommodates an o-ring 12 and an energizing ring 14. Without pressure, the o-ring 12 sits in the gland 10c and is clear of the piston bore 26 defined by the inside diameter (ID) of the valve body 10b. The energizing ring 14 is designed as a clearance fit to the bore 26 as well, so there is little to no seal drag. When there is a pressure differential (higher pressure on the energizing ring side), the energizer ring 14 compresses the o-ring 12 forcing the outside diameter (OD) of the o-ring 12 out and into contact with the piston ring 10b and seals the piston bore 26. When the solenoid 18 is commanded to actuate and dump the accumulator, the piston 10a moves up and unloads the o-ring 12 allowing the o-ring 12 to retract from the piston bore 26 and eliminate the drag.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for holding pressure and volume of an accumulator with low leakage and for providing low actuation drag during a release stroke of a solenoid actuated valve (10) for dumping fluid contents of the accumulator at very low current draw comprising:

providing a groove (10c) in one of two elongate valve members (10a, 10b) movable axially with respect to one another;

positioning an o-ring (12) in the groove (10c);

maintaining the o-ring (12) in a non-contacting relationship with respect to the other of the two elongate valve members (10b) when in a non-energized state; and assembling an energizer ring (14) within the groove (10c) for axially reciprocal movement with respect to the o-ring (12), where the energizer ring (14) is axially movable toward the o-ring (12) in response to fluid pressure against a surface (14a) opposite from the o-ring (12) and the o-ring (12) being compressible by the energizer ring (14) thereby causing radial expansion of the o-ring (12) into sealing contact with the other of the two elongate valve members (10b) when in an energized state thereby sealing the solenoid actuated valve (10) in response to fluid pressure for holding pressure and volume of the accumulator with low leakage while the two elongate valve members (10a, 10b) are stationary with respect to one another, where the o-ring is releasable from the energized state between the two elongate valve members (10a, 10b) into the non-energized state in response to initial movement of a release stroke of the solenoid actuated valve (10) thereby providing low actuation drag during relative movement between the two elongate valve members (10*a*, 10*b*) for dumping fluid contents of the accumulator at very low current draw.

2. The method of claim 1 further comprising:
providing the energizer ring (14) with a rectangular cross section.

3. The method of claim 1 further comprising:
providing the energizer ring (14) with an L-shaped cross section (14*b*).

4. The method of claim 1 further comprising:
providing the energizer ring (14) with an L-shaped cross section (14*b*) having an angled o-ring engaging surface (14*c*).

5. A one-way pressure activated piston seal comprising:
two elongate members (10*a*, 10*b*) movable axially relative to one another with a groove (10*c*) formed in one of the two elongate members (10*a*);
an o-ring (12) located within the groove (10*c*) formed in the one of the two elongate members (10*a*), while the o-ring (12) is maintained in a non-contacting relationship with respect to the other of the two elongate members (10*b*) when in a non-energized state; and
an energizer ring (14) located within the groove (10*c*) for axially reciprocal movement with respect to the o-ring (12), where the energizer ring (14) is axially movable toward the o-ring (12) in response to fluid pressure against a surface (14*a*) opposite from the o-ring (12) and the o-ring (12) being compressible by the energizer ring (14) to expand the o-ring (12) radially into sealing contact with the other of the two elongate members (10*b*) when in an energized state while the two elongate members (10*a*, 10*b*) are stationary with respect to one another, where the o-ring is releasable from the energized state between the two elongate members (10*a*, 10*b*) into the non-energized state in response to initial movement between the two elongate members (10*a*, 10*b*) minimizing drag during relative movement between the two elongate members (10*a*, 10*b*).

6. The seal of claim 5, wherein the energizer ring (14) has a rectangular cross section.

7. The seal of claim 5, wherein the energizer ring (14) has an L-shaped cross section (14*b*).

8. The seal of claim 5, wherein the energizer ring (14) has an L-shaped cross section (14*b*) with an angled o-ring engaging surface (14*c*).

9. A solenoid actuated valve (10) for holding pressure and volume of an accumulator with low leakage and for providing low actuation drag during a release stroke of the solenoid actuated valve (10) for dumping fluid contents of the accumulator at very low current draw comprising:
two elongate valve members (10*a*, 10*b*) movable axially relative to one another with a groove (10*c*) formed in one of the two elongate valve members (10*a*);
an o-ring (12) located within the groove (10*c*) formed in the one of the two elongate valve members (10*a*), where the o-ring (12) is maintained in a non-contacting relationship with respect to the other of the two elongate valve members (10*b*) when in a non-energized state; and
an energizer ring (14) located within the groove (10*c*) for axial movement with respect to the o-ring (12), where the energizer ring (14) is axially movable toward the o-ring (12) in response to fluid pressure against a surface (14*a*) opposite from the o-ring (12) and the o-ring (12) being compressible by the energizer ring (14) causing the o-ring (12) to expand radially into sealing contact with the other of the two elongate valve members (10*b*) when in an energized state thereby sealing the solenoid actuated valve (10) in response to fluid pressure for holding pressure and volume of the accumulator with low leakage while the two elongate valve members (10*a*, 10*b*) are stationary with respect to one another, the o-ring being releasable from the energized state between the two elongate valve members (10*a*, 10*b*) into the non-energized state in response to initial movement of a release stroke of the solenoid actuated valve (10) thereby providing low actuation drag during relative movement between the two elongate valve members (10*a*, 10*b*) for dumping fluid contents of the accumulator at very low current draw.

10. The valve (10) of claim 9, wherein actuation of the solenoid actuated valve (10) unloads compressive pressure on the o-ring (12) allowing retraction from the radially expanded energized state to the non-contacting relationship with respect to the other of the two elongated valve members (10*a*, 10*b*) in the non-energized state.

11. The valve (10) of claim 9, wherein the energizer ring (14) has a rectangular cross section.

12. The valve (10) of claim 9, wherein the energizer ring (14) has an L-shaped cross section (14*b*).

13. The valve (10) of claim 9, wherein the energizer ring (14) has an L-shaped cross section (14*b*) with an angled o-ring engaging surface (14*c*).

* * * * *